US010738549B1

(12) United States Patent
Jamison et al.

(10) Patent No.: US 10,738,549 B1
(45) Date of Patent: Aug. 11, 2020

(54) METHODS TO MANAGE WATER INFLUX SUITABLE FOR PULSED ELECTRICAL DISCHARGE DRILLING

(71) Applicant: Halliburton Energy Services, Inc., Houston, TX (US)

(72) Inventors: Dale E. Jamison, Humble, TX (US); William Walter Shumway, Spring, TX (US); Rocio Macarena Moyano Dip, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/588,429

(22) Filed: Sep. 30, 2019

(51) Int. Cl.
E21B 21/06 (2006.01)
C09K 8/36 (2006.01)
C09K 8/26 (2006.01)

(52) U.S. Cl.
CPC .............. *E21B 21/063* (2013.01); *C09K 8/26* (2013.01); *C09K 8/36* (2013.01)

(58) Field of Classification Search
None
See application file for complete search history.

(56) References Cited

U.S. PATENT DOCUMENTS

| 4,449,849 | A |   | 5/1984  | Horn et al. |           |
|-----------|---|---|---------|-------------|-----------|
| 4,664,816 | A | * | 5/1987  | Walker      | C09K 8/24 |
|           |   |   |         |             | 175/72    |
| 5,072,794 | A | * | 12/1991 | Hale        | C09K 8/36 |
|           |   |   |         |             | 175/50    |
| 5,258,123 | A | * | 11/1993 | Huang       | B01D 15/00 |
|           |   |   |         |             | 210/663   |
| 6,074,563 | A |   | 6/2000  | Sicotte et al. |        |
| 6,251,288 | B1 |  | 6/2001  | Sicotte et al. |        |
| 7,939,470 | B1 | * | 5/2011 | Wagle       | C09K 8/36 |
|           |   |   |         |             | 166/305.1 |
| 8,685,900 | B2 | * | 4/2014 | Ezell       | C09K 8/512 |
|           |   |   |         |             | 507/117   |

(Continued)

FOREIGN PATENT DOCUMENTS

WO    2019139576 A1    7/2019

OTHER PUBLICATIONS

Foreign Communication from Related Application—International Search Report and Written Opinion of the International Searching Authority, International Application No. PCT/US2019/055184, dated Jun. 24, 2020, 12 pages.

*Primary Examiner* — Anuradha Ahuja
(74) *Attorney, Agent, or Firm* — Conley Rose, P.C.; Rodney B. Carroll

(57) ABSTRACT

A method of managing water content of a pulsed power drilling fluid, the method comprising contacting the pulsed power drilling fluid with a water absorbent material, wherein the pulsed power drilling fluid comprises water at a first water concentration, and whereby the water absorbent material absorbs at least a portion of the water from the pulsed power drilling fluid to provide a treated pulsed power drilling fluid and a spent water absorbent material comprising absorbed water, wherein the treated pulsed power drilling fluid comprises water at a second water concentration, wherein the second water concentration is lower than the first water concentration. A pulse power drilling fluid and a system for carrying out the method are also provided.

19 Claims, 5 Drawing Sheets

(56) References Cited

U.S. PATENT DOCUMENTS

| | | | |
|---|---|---|---|
| 8,839,859 B2* | 9/2014 | Ivan | E21B 21/068 166/267 |
| 2006/0037516 A1* | 2/2006 | Moeny | B23H 1/08 106/486 |
| 2008/0164067 A1* | 7/2008 | Tehrani | E21B 21/068 175/66 |
| 2009/0270280 A1* | 10/2009 | Zhang | C09K 8/36 507/211 |
| 2010/0050761 A1* | 3/2010 | Lawrence | E21B 49/005 73/152.28 |
| 2010/0204066 A1 | 8/2010 | Ivan et al. | |
| 2012/0108472 A1* | 5/2012 | Wu | C04B 18/022 507/112 |
| 2014/0024561 A1* | 1/2014 | Reddy | C08J 3/245 507/117 |
| 2015/0322326 A1* | 11/2015 | Van Slyke | C09K 8/34 175/16 |
| 2016/0289530 A1* | 10/2016 | Nelson | C09K 8/52 |
| 2017/0073565 A1* | 3/2017 | McDaniel | C09K 8/32 |
| 2017/0362490 A1 | 12/2017 | Van Slyke et al. | |
| 2018/0148981 A1* | 5/2018 | Moeny | E21B 17/003 |

* cited by examiner

METHODS TO MANAGE WATER INFLUX SUITABLE FOR PULSED ELECTRICAL DISCHARGE DRILLING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to systems and methods for pulse powered drilling; more specifically, the present disclosure provides systems and methods for managing water content of a pulsed power drilling fluid; still more particularly, the present disclosure provides systems and methods for maintaining a water concentration of a pulsed power drilling fluid below a threshold level by removing water from the pulsed power drilling fluid as needed via contacting of the pulsed power drilling fluid with a water absorbent material.

BACKGROUND

Processes using pulsed power technology are known in the art for breaking mineral lumps. In such processes, a conduction path or streamer is created inside a formation rock to break it. An electrical potential is impressed across electrodes which contact the rock, from a high voltage electrode to a low voltage or ground electrode. At sufficiently high electric field, an arc or plasma is formed inside the rock from the high voltage electrode to the low voltage or ground electrode. The expansion of the hot gases created by the arc fractures the rock. When the streamer connects one electrode to the next, current flows through the conduction path, or arc, inside the rock. The high temperature of the arc vaporizes the rock and any water or other fluids touching or adjacent the arc. The vaporization process creates high-pressure gas in the arc zone, which expands, breaking the rock into fragments.

During such pulse powered drilling processes, it is advantageous to use, as drilling fluid, an insulating liquid that has a high relative permittivity (dielectric constant) to shift the electric fields away from the liquid and into the rock in the region of the electrodes. The insulating drilling fluid should provide high relative permittivity (dielectric constant) to provide high electric fields at the electrodes and shift a higher proportion of the electric field into the rock near the electrodes, and low conductivity to provide low leakage current during the delay time from application of the voltage until the arc ignites in the rock. Water provides high relative permittivity, but has high conductivity unless virtually free of ions, thus creating high electric charge losses. Thus, water has excellent energy storage properties, but requires extensive deionization to render it sufficiently resistive that it does not discharge the high voltage components by current leakage through the liquid. Deionized water is very corrosive and can dissolve many materials, including metals. As a result, water must be continually conditioned to maintain the high resistivity required for high voltage applications. Even when deionized, water may quickly attain sufficient conductivity that it is not suitable for long-duration, pulsed power applications.

Thus, while pulsed power drilling has the potential to dramatically change hard rock drilling due to the very fast rate of penetration (ROP) that is possible, when water becomes entrained in a pulsed power drilling fluid, for example, when water kicks are encountered or formation water from cuttings become entrained in the drilling fluid, the drilling efficiency can be undesirably reduced or the process halted. Accordingly, there is a need for systems and methods of recovering water from pulse power drilling fluids, whereby drilling efficiency can be maintained during pulse powered drilling operations. Desirably, the systems and methods allow for real time, economical removal of water at a drill site, rather than via treatment at, for example, a mud plant.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
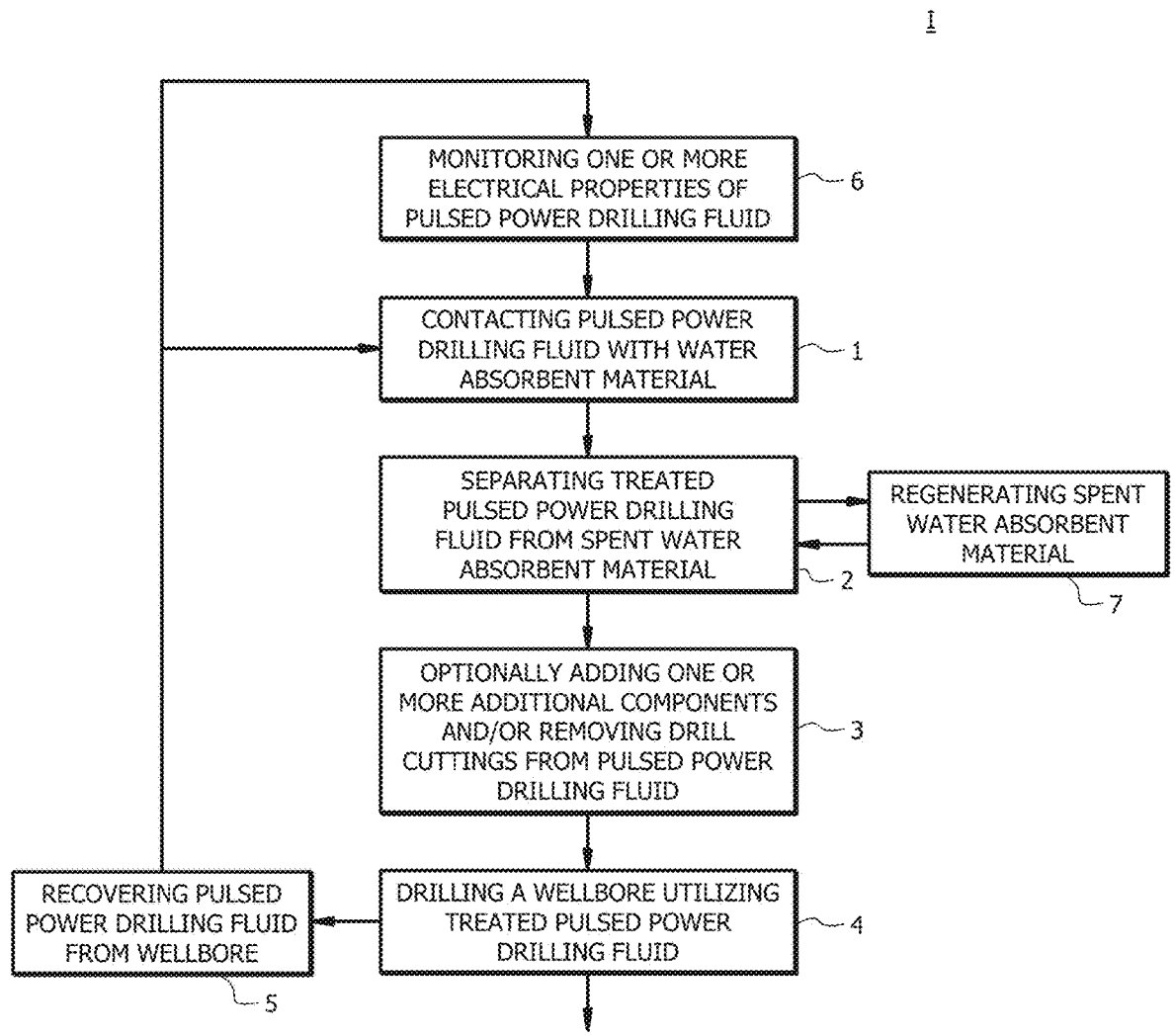
FIG. 1 is a flow diagram of a method I, according to embodiments of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The terms "pulse power" drilling fluids and "pulsed power" drilling fluids are utilized interchangeably herein, and refer to drilling fluids suitable to be utilized for pulsed electrical discharge drilling and demolition by (e.g., low-duration, high voltage) electric pulses.

Herein disclosed are systems and methods for managing water influx in wellbore servicing fluids, such as drilling fluids or, more specifically, pulse power drilling fluids. Water/brine influx is a common occurrence of drilling and is thus to be expected in any drilling operation, including pulse power drilling. Water influx can be potentially troublesome for pulse power fluids, as pulse power drilling requires maintenance of desirable dielectric (DE) properties of a drilling fluid (e.g., a pulse power drilling fluid), namely the dielectric constant and conductivity. Water influx can have a significant negative impact on the conductivity of the pulsed power drilling fluid, such that excess water influx can result in ceasing of pulse power drilling operations. Without the ability to remove water from the pulse power drilling fluid as detailed herein, the conventional solution has been to significantly dilute the drilling fluid to reduce the water content thereof. Such dilution can undesirably add a great deal of additional volume and expense.

Via the herein disclosed system and method, water influx into the pulse power drilling fluid can be managed by utilization of a water absorptive solid that can, in embodiments, be removed at the surface of a wellbore, whereby water can be removed from the wellbore servicing fluid without changing the overall dielectric character of the wellbore servicing fluid. As detailed further hereinbelow, suitable absorbent materials include: superabsorbent polymers, Drierite, cellulose fiber, starches and modified starches and clathrate structures. Such clathrate structures include, for example, molecular sieves, such as 4 angstrom molecular sieves. Some such water absorbent materials, such as molecular sieves, can be activated to react with water, removed/separated from the fluid system once having absorbed water, and reactivated (for reuse), for example, by heating or exposure to microwaves. As utilized herein, a modified starch is a starch that has been physically, chemically, or enzymatically treated, for example to increase an amount of water pre per unit mass that can be absorbed thereby.

According to this disclosure, water removal can be effected by adding the water absorbent material (e.g., the water absorbing solid) to a wellbore servicing fluid (e.g., a drilling fluid or pulse power drilling fluid), in embodiments while drilling and/or in a mud pit. Once the water absorbent material has taken up water, it can be screened or otherwise separated from the wellbore servicing fluid. Any suitable screening device, such as, without limitation, a shaker screen or similar device can be utilized to effect the separation of the absorbent material from the wellbore servicing fluid. Depending on the water absorbent material utilized, the water absorbent material can, in embodiments, be treated to remove the absorbed water therefrom, thus reactivating the water absorbent material, whereby it can be reutilized to remove water from further wellbore servicing fluid.

According to embodiments of this disclosure, water influx into a pulsed power drilling fluid (e.g., when water kicks are encountered and/or formation water from cuttings become entrained in the drilling fluid), water can be removed from the wellbore servicing fluid while the fluid is being used, as opposed to treatment at a mud plant, and/or the excess water can be removed without the dilution (or degree of dilution) conventionally utilized to restore the dielectric properties of the wellbore servicing fluid.

Herein disclosed are a system and a method for managing water content of a wellbore servicing fluid, such as a drilling fluid or, more particularly, a pulsed power drilling fluid. Although the system and method disclosed herein can be utilized to manage water content of a variety of wellbore servicing fluids, description will be made hereinbelow with reference to pulsed power drilling fluids.

As depicted in the flow diagram of FIG. 1, a method I of this disclosure comprises contacting the pulsed power drilling fluid with a water absorbent material at 1, whereby the water absorbent material absorbs at least a portion of the water from the pulsed power drilling fluid to provide a spent water absorbent material and a treated pulsed power drilling fluid. Accordingly, the pulsed power drilling fluid comprises water at a first water concentration, and the treated pulsed power drilling fluid comprises water at a second water concentration, wherein the second water concentration is lower than the first water concentration. The method I can further comprise separating the treated pulsed power drilling fluid from the spent water absorbent material, as indicated at step 2, optionally adding one or more additional components (e.g., one or more components of the pulse power drilling fluid absorbed by the water absorbent material along with the water) and/or removing one or more additional components (e.g., drill cuttings), as indicated at step 3, drilling a wellbore utilizing the treated pulsed power drilling fluid, as indicated at step 4, recovering pulsed power drilling fluid from the wellbore, as indicated at step 5, and/or monitoring one or more electrical properties of the pulsed power drilling fluid, as indicated at step 6. Each of these steps will be described in more detail hereinbelow. Although indicated in a certain order in the schematic of FIG. 1, it is to be understood that, in embodiments, one or more steps 1-6 can be rearranged and/or absent from a method of this disclosure. For example, optionally removing one or more components from the pulsed power drilling fluid at step 3 can be effected prior to contacting the pulsed power drilling fluid with the water absorbent material at step 1, in embodiments.

A method of managing water content of a pulsed power drilling fluid will now be described with reference to FIG. 2A, which is a schematic of a wellbore servicing system according to embodiments of this disclosure. In embodiments, a method of managing water content of a pulsed power drilling fluid comprises drilling a wellbore utilizing a pulsed power drilling fluid at step 4. In such embodiments, the method can comprise drilling a wellbore 10 with a pulsed power drill bit 40 coupled to the end 21 of a drill string 20. The pulsed power drill bit 40 switches a high voltage pulse across at least two electrodes (e.g., a first electrode E1 and a second electrode E2) in contact with the bottom 11 of the wellbore 10 to pulverize formation rock 85 into drill cuttings and thus form wellbore 10. The method of this disclosure can further comprise, during the drilling at step 4, circulating the pulsed power drilling fluid downward through the drill string 20 out the pulsed power drill bit 40, and upward through an annular space or annulus 30 formed between the drill string 20 and the wellbore 10, such that the drill cuttings associated with the pulsed power drilling fluid flow upward in the annular space 30. In embodiments such as that of FIG. 2A, pulsed power drilling fluid (e.g., treated and/or fresh pulsed power drilling fluid) is introduced into wellbore 10 via pulsed power drilling fluid inlet line 75. In embodiments, drilling at step 4 further comprises, as indicated at step 5 of FIG. 1, recovering a recovered pulsed power drilling fluid (e.g., and associated drill cuttings) from the annular space 30. For example, in the embodiment of FIG. 2A, recovered pulsed power drilling fluid flowing up annulus 30 is recovered via recovered pulsed power drilling fluid outlet line 35.

Figure 2A:
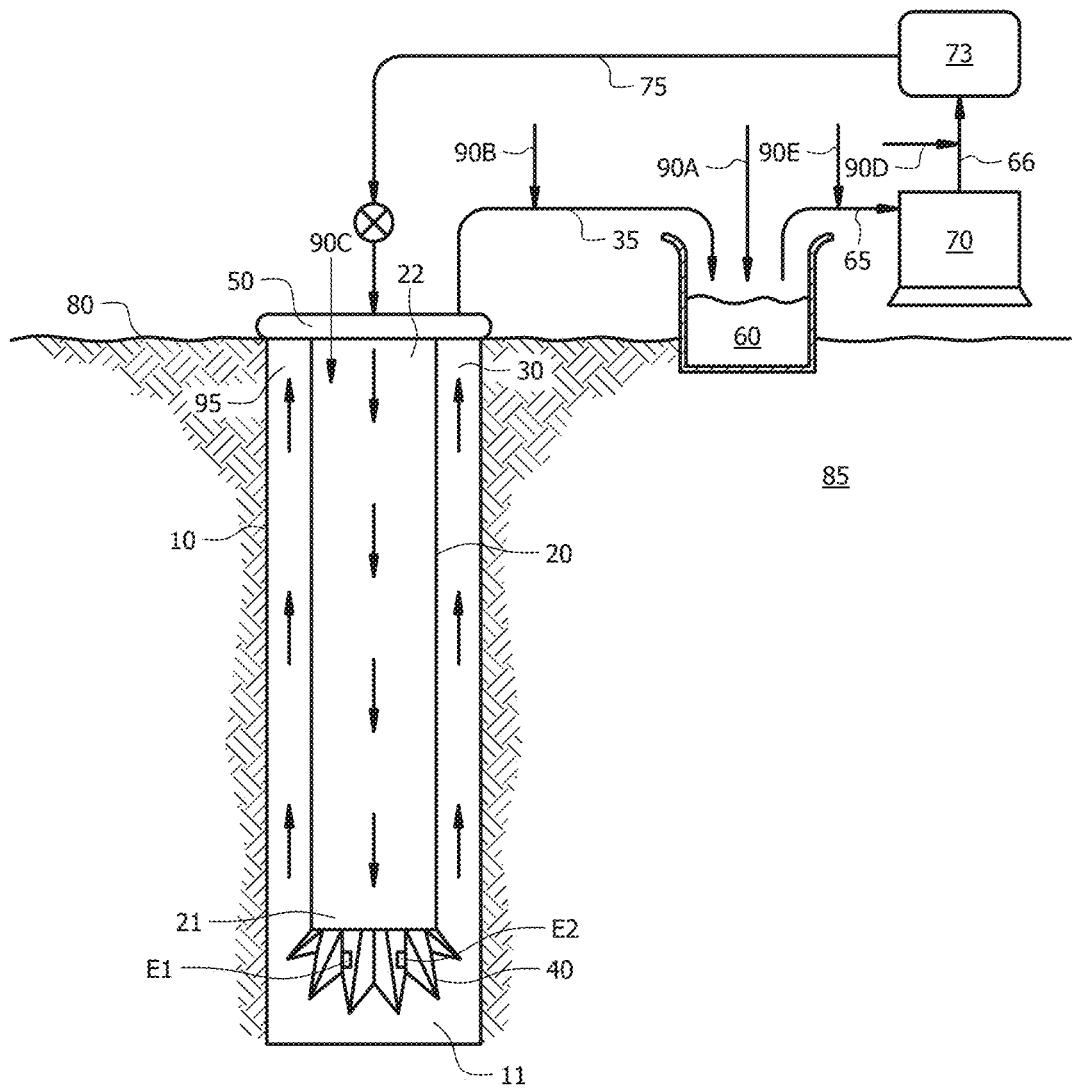
FIG. 2A is a schematic of a wellbore servicing system IIA, according to an exemplary embodiment of this disclosure.
Figure 2B:
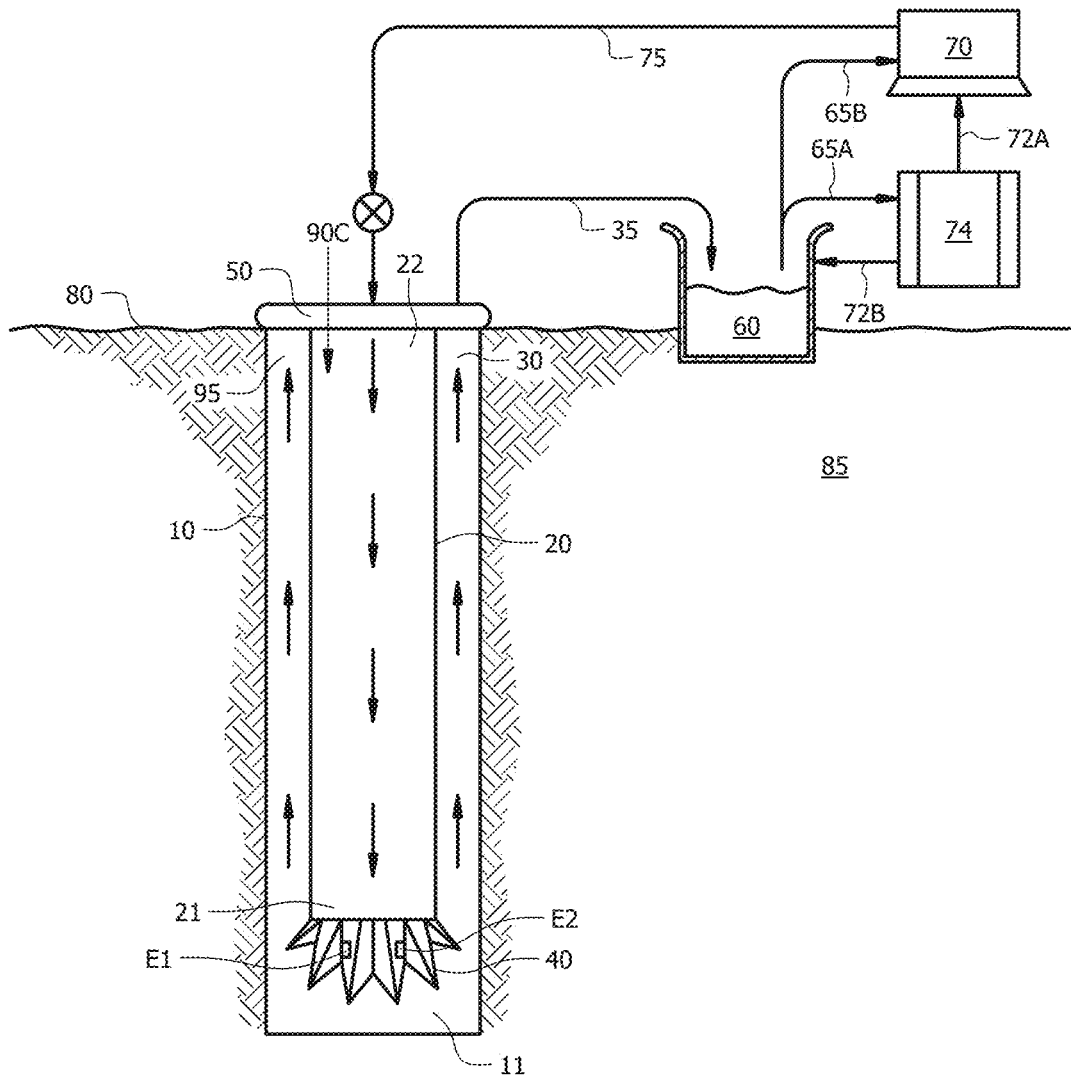
FIG. 2B is a schematic of a wellbore servicing system IIB, according to an exemplary embodiment of this disclosure.

Although depicted in FIG. 2A and FIG. 2B with pulsed power drilling fluid being introduced into pulsed power drill bit 40 and recovered via upward flow through annulus 30, it is envisioned that such flow can, in embodiments, be reversed. In such embodiments, pulsed power drilling fluid inlet line 75 would introduce pulsed power drilling fluid (e.g., fresh and/or treated pulsed power drilling fluid) into annulus 30, the drilling fluid would flow downward within annulus 30, and back through pulsed power drill bit 40 into drill string 20, and would flow out the top end 22 of drill string 20, which would be fluidly connected with recovered pulsed power drilling fluid outlet line 35.

As noted hereinabove, a method of managing water content of a pulsed power drilling fluid according to this disclosure comprises, as indicated at step 1 of FIG. 1, contacting all or a portion of the recovered pulsed power drilling fluid with a water absorbent material whereby the water absorbent material absorbs at least a portion of the water from the recovered pulsed power drilling fluid to provide a spent water absorbent material comprising absorbed water and a treated pulsed power drilling fluid, wherein the recovered pulsed power drilling fluid comprises water at a first water concentration, wherein the treated pulsed power drilling fluid comprises water at a second water concentration, and wherein the second water concentration is lower than the first water concentration. In embodiments, as indicated at step 3 of FIG. 1, the method can further comprise removing all or a portion of the drill cuttings from the recovered pulsed power drilling fluid, from the treated pulsed power drilling fluid, or both.

In embodiments, the pulsed power drilling fluid (e.g., the recovered pulsed power drilling fluid, the treated pulsed power drilling fluid) comprises a hydrophobic external phase and an aqueous internal phase. In embodiments, the treated pulsed power drilling fluid has an oil to water ratio (OWR) of the hydrophobic external phase to the aqueous internal phase that is in a range of from about 40:60 to about 80:20, from about 50:50 to about 65:35, or from about 50:50 to about 80:20. In embodiments, the internal phase of the treated pulsed power drilling fluid comprises from about 0 to about 20, from about 0 to about 10, from about 0 to about 5, or less than or equal to about 20, 15, 10, 9, 8, 7, 6, 5, 4, 3, 2, 1, or 0 volume percent (vol %) water. In embodiments, the internal phase comprises water and glycerin. In embodiments, the internal phase of the treated pulsed power drilling fluid (e.g., the remainder of the internal phase) further comprises from about 80 to about 100, from about 90 to about 100, or greater than or equal to about 80, 85, 90, 95, 96, 97, 98, 99, or 100 volume percent (vol %) glycerin. In embodiments, the hydrophobic external phase of the pulsed power drilling fluid comprises a crude oil, diesel, a mineral oil, a paraffin, an olefin, an esters, bio-diesel, a fluorocarbon, or a combination thereof. Accordingly, in embodiments, the second concentration of water (e.g., the water concentration of the treated pulsed power drilling fluid) is in a range of from about 0 to about 15, 14, 13, 12, 11, 10, 9, 8, 7, 6, 5, 4, 3, 2, 1 vol % water. In embodiments, the second water concentration is less than a threshold level of the pulsed power drilling fluid. That is, in embodiments, the second water concentration is below a threshold level above which a pulsed power drilling operation will fail and/or a drilling efficiency of a drilling operation operated therewith will be reduced. In embodiments, the first concentration of water (e.g., the water concentration in the recovered pulsed power drilling fluid recovered from wellbore 10) is in a range of from about 10 to about 30, from about 20 to about 40, from about 10 to about 40, or greater than or equal to about 10, 20, 30, or 40 vol % water.

In embodiments, the treated pulsed power drilling fluid is insulative, as defined by a dielectric strength greater than or equal to about 320, 310, 300, 290, 280, 270, 260, or 250 kV.

In embodiments, a target threshold dielectric strength for the treated pulsed power drilling fluid is a dielectric strength greater than or equal to about 320, 310, 300, 290, 280, 270, 260, or 250 kV. In embodiments, the treated pulsed power drilling fluid has a dielectric (DE) constant that is greater than or equal to about 12, 11, 10, 9, 8, 7 or 6. In embodiments, a target threshold dielectric constant for the treated pulsed power drilling fluid is a dielectric constant greater than or equal to about 12, 11, 10, 9, 8, 7 or 6. In embodiments, the treated pulsed power drilling fluid has a low conductivity, as defined by a conductivity that is in a range of from about 6 to about 10 mho/cm, from about 5 to about 10 mho/cm, from about 4 to about 10 mho/cm, or less than or equal to about 10, 9, 8, 7, 6, 5, 4, 3, 2, or 1 mho/cm. In embodiments, a target threshold conductivity for the treated pulsed power drilling fluid is a conductivity that is in a range of from about 6 to about 10 mho/cm, from about 5 to about 10 mho/cm, from about 4 to about 10 mho/cm, or less than or equal to about 10, 9, 8, 7, 6, 5, 4, 3, 2, or 1 mho/cm. In embodiments, the treated pulsed power drilling fluid has a combination of the aforementioned properties, i.e., has a dielectric strength (e.g., a target dielectric strength), a dielectric constant (e.g., a target dielectric constant), and/or a conductivity (e.g., a target conductivity) as delineated above.

In embodiments, the water absorbent material is a solid material. In embodiments, the water absorbent material comprises a superabsorbent polymer, drierite, cellulose fiber, a clathrate structure, a molecular sieve, or a combination thereof. As utilized herein, a superabsorbent material is defined by an ability to absorb at least 50, 60, 70, 80, 90, or 100 times its weight in water.

In embodiments, in addition to water, the water absorbent material further absorbs an additional component of the pulsed power drilling fluid (e.g., another component of an internal phase thereof). In such embodiments, the method can further comprise, as indicated at step 3 of FIG. 1, subsequent and/or prior to the contacting of the pulsed power drilling fluid with the water absorbent material, adding an amount of the additional component back to provide the treated pulsed power drilling fluid. Such an additional component can comprise, without limitation, glycerin, emulsifier, fluid loss control agents, rheology modifiers, or a combination thereof. In embodiments, the treated pulsed power drilling fluid is provided via the system and method of this disclosure without diluting by more than 10, 15, or 20% of a volume of the pulsed power drilling fluid. In embodiments, a dilution needed to provide the treated pulsed power drilling fluid is less than or equal to about 10, 20, 30, 40, 50, 60, 70, 80, 90, or 100 vol % of a volume conventionally needed to provide the pulsed power drilling fluid at the same threshold water concentration (e.g., the "second" water concentration) from a recovered pulsed power drilling fluid having the same (e.g., excess or "first") water concentration.

The pulsed power drilling fluid (e.g., the recovered pulsed power drilling fluid obtained at step 5 of FIG. 1) can be contacted with the water absorbent material (e.g., as indicated at step 1 of FIG. 1) by any methods known to those of skill in the art. A few such methods will now be described. In embodiments, contacting the pulsed power drilling fluid with the water absorbent material can comprise introducing the water absorbent material into a flowing stream of the pulsed power drilling fluid and/or into a non-flowing volume of the pulsed power drilling fluid. For example, with reference to the embodiment of FIG. 2A, in embodiments, water absorbent material can be introduced into annulus 30 (e.g., via water absorbent material inlet line 90C), into recovered pulsed power drilling fluid line 35 (e.g., via water absorbent material inlet line 90B), into a recovered pulsed power drilling fluid storage apparatus, such as a mud tank 60 (e.g., via water absorbent material inlet line 90A), into a line (e.g., via water absorbent material inlet line 90E), such as mud pit outlet line 65 fluidly connecting such a recovered pulsed power drilling fluid storage apparatus, such as mud tank 60, with downstream apparatus, such as a mud pump 70, and/or into a line (e.g., via water absorbent material inlet line 90D), such as mud pump outlet line 66, fluidly connecting the downstream apparatus, such as mud pump 70, with a further downstream apparatus, such as separator 73 fluidly connected with pulsed power drilling fluid inlet line 75 or directly connecting the downstream apparatus, such as mud pump 70, with pulsed power drilling fluid inlet line 75. Thus, in embodiments, contacting the pulsed power drilling fluid with the water absorbent material can comprise introducing the water absorbent material into a flowing stream of the pulsed power drilling fluid (or recovered pulsed power drilling fluid), such as a flowing stream of pulsed power drilling fluid within annulus 30, within recovered pulsed power drilling fluid outlet line 35, within mud pit outlet line 65, within mud pump outlet line 66, or elsewhere within a system IIA of this disclosure. Alternatively or additionally, contacting the pulsed power drilling fluid with the water absorbent material can comprise introducing the water absorbent material into a non-flowing volume of the pulsed power drilling fluid, such as a non-flowing volume of pulsed power drilling fluid within a mud pit 60, or another pulsed power drilling fluid storage or treatment apparatus. Thus, in some embodiments, introducing the water absorbent material into the non-flowing volume of the pulsed power drilling fluid comprises introducing the water absorbent material into a mud pit 60, for example via a water absorbent material inlet line 90A as depicted in the embodiment of FIG. 2A.

In embodiments, contacting the pulsed power drilling fluid with the water absorbent material (e.g., as indicated at step 1 of FIG. 1) comprises introducing a permeable container containing and retaining the water absorbent material into the flowing stream of the pulsed power drilling fluid and/or into the non-flowing volume of the pulsed power drilling fluid. For example, a sack or other permeable retention apparatus that retains the water absorbent material and can, depending on the water absorbent material, allow for expansion thereof upon water absorption can be introduced into the flowing stream and/or the non-flowing volume of the pulsed power drilling fluid (e.g., the recovered pulsed power drilling fluid). For example, with reference to the embodiment of FIG. 2A, a sack or other permeable retention apparatus can be introduced into mud pit 60, as indicated via water absorbent material inlet 'line' 90A, in embodiments.

Alternatively, or additionally, contacting the pulsed power drilling fluid with the water absorbent material (e.g., at step 1 of FIG. 1) can comprise passing a stream of the pulsed power drilling fluid through a non-flowing volume of the water absorbent material. For example, a stream of the recovered pulsed power drilling fluid can be introduced into a contained non-flowing volume of the water absorbent material. For example, the water absorbent material can be positioned within a drum or other apparatus that is permeable to the recovered pulsed power drilling fluid (and may or may not be permeable to the recovered drill cuttings) and retains the water absorbent material, and a stream of the treated pulsed power drilling fluid removed from the non-flowing volume of the water absorbent material. By way of example, with reference to FIG. 2B, which is a schematic of a wellbore servicing system IIB, according to embodiments of this disclosure, a contacting apparatus 74 comprising a retained (e.g., non-flowing) volume of water absorbent material can be fluidly connected with a recovered pulsed power drilling fluid storage or treatment unit, such as mud pit 60, or can be a part of such a recovered pulsed power drilling fluid storage or treatment unit, such as an integrated part or section of mud pit 60. In such embodiments, recovered pulsed power drilling fluid can be introduced into contacting apparatus 74 via, for example, mud pit outlet line 65A. Within contacting apparatus 74, the recovered pulsed power drilling fluid is contacted with the water absorbent material, whereby water is removed therefrom. In such embodiments, treated pulsed power drilling fluid can be returned to the recovered pulsed power drilling fluid storage or treatment apparatus, such as to mud pit 60, via a line 72B, and/or can be pumped via line 72A and mud pump 70 back into wellbore 10 via treated pulsed power drilling fluid inlet line 75. In embodiments in which the treated pulsed power drilling fluid is returned to the recovered pulsed power drilling fluid storage or treatment apparatus, such as to mud pit 60, via line 72B, a mud pit output line 65B can fluidly connect the recovered pulsed power drilling fluid storage and/or treatment apparatus, such as mud pit 60, with mud pump 70, whereby treated pulsed power drilling fluid in pulsed power drilling fluid storage and/or treatment apparatus, such as mud pit 60, can be pumped into wellbore 10 via treated pulsed power drilling fluid inlet line 75.

In embodiments, a water management method of this disclosure further comprises, as indicated at step 2 of FIG. 1, separating the treated pulsed power drilling fluid from the spent water absorbent material. For example, separating the treated pulsed power drilling fluid from the spent water absorbent material can comprise screening and/or otherwise filtering the spent water absorbent material from the treated pulsed power drilling fluid. In embodiments in which the water absorbent material flows with the pulsed power drilling fluid, for example, a separator 73 can be utilized to separate the treated pulsed power drilling fluid from the spent water absorbent material prior to introducing the treated pulsed power drilling fluid (from which the spent water absorbent material has been removed) into wellbore 10. In embodiments, separator 73 is downstream from the pulsed power drilling fluid storage and/or treatment apparatus, such as mud pit 60, and pulsed power drilling fluid is pumped, for example via mud pump 70 and mud pump outlet line 66 into separator 73. Treated pulsed power drilling fluid can be introduced into wellbore 10 via treated pulsed power drilling fluid inlet line 75. In embodiments, separating the treated pulsed power drilling fluid from the spent water absorbent material comprises separating the spent water absorbent material from the treated pulsed power drilling fluid via gravity. In some such embodiments, separator 73 can comprise a settler. In embodiments, settling occurs in a pulsed power drilling fluid storage and/or treatment apparatus, such as within mud pit 60.

In embodiments, separating the treated pulsed power drilling fluid from the spent water absorbent material (e.g., at step 2 of FIG. 1) comprises passing a stream of the treated pulsed power drilling fluid out of a non-flowing volume of the absorbent material or removing a non-flowing volume of the water absorbent material from a volume of the treated pulsed power drilling fluid. For example, in embodiments in which the water absorbent material is non-flowing, the treated pulsed power drilling fluid can be separated from the spent water absorbent material, for example via passage out of contacting apparatus 74. In embodiments in which a sack or otherwise contained volume of water absorbent material is introduced into the pulsed power drilling fluid, separating the spent water absorbent from the treated pulsed power drilling fluid can comprise removing the sack or the otherwise contained volume of the now spent water absorbent from the treated pulsed power drilling fluid. (Although referred to as 'spent', a 'spent' water absorbent material has contacted some amount of pulsed power drilling fluid, but may or may not still have capacity to absorb additional water.)

In embodiments, prior to absorbing water, the water absorbent material has an average particle size of greater than or equal to about 200 mesh (74 μm), 170 mesh (88 μm), 140 mesh (105 μm), 120 mesh (125 μm), 100 (150 μm), 80 mesh (177 μm), 70 mesh (210 μm), or 60 mesh (250 μm), or in a range of from about 200 mesh (74 μm), to about 60 mesh (250 μm), from about 170 mesh (88 μm) to about 60 mesh (250 μm), or from about 140 mesh (105 μm) to about 60 mesh (250 μm). In embodiments, the water absorbent material is larger in size than all the other (e.g., mud) components, such that the water absorbent material can be removed (e.g., in a water removal pit) separately from the mud system. In embodiments, separator 73, mud pit 60, and/or an additional apparatus of a system of this disclosure is operable to remove cuttings (e.g., in addition to water) from the recovered pulsed power drilling fluid. Accordingly, as depicted in FIG. 1, in such embodiments, a method I of this disclosure can further comprise, as indicated at step 3, removing one or more additional components (e.g., drill cuttings) from the pulsed power drilling fluid prior to the contacting at step 1, or from the treated pulsed power drilling fluid obtained via the contacting at step 1.

In embodiments, a water management method of this disclosure further comprises regenerating the spent water absorbent material, as indicated at step 7 of FIG. 1. Regenerating the spent water absorbent material can comprise removing absorbed water from the spent water absorbent material to provide a regenerated absorbent. The regenerating of the spent water absorbent material can be effected via any suitable methods known to those of skill in the art to be suitable for removing water from the particular water absorbent material being utilized. By way of examples, in embodiments, regenerating the spent water absorbent material can comprise heating the spent water absorbent material, exposing the spent water absorbent material to microwaves, or a combination thereof.

As noted hereinabove, in embodiments, in addition to water, the water absorbent material further absorbs an additional component of the pulsed power drilling fluid. In such embodiments, the method can further comprise (e.g., as indicated at step 3 of FIG. 1), subsequent and/or prior to the contacting of the pulsed power drilling fluid with the water absorbent material, adding an amount of the additional component to the pulsed power drilling fluid (e.g., to the recovered pulsed power drilling fluid and/or to the treated pulsed power drilling fluid). For example, additional components can be added anywhere within system IIA of FIG. 2A or system IIB of FIG. 2B, such as, for example, to the recovered pulsed power drilling fluid in recovered pulsed power drilling fluid outlet line 35, to the storage and/or treatment apparatus, such as mud pit 60, to an outlet line of storage and or treatment apparatus, such as to mud pit outlet line 65 (FIG. 2A), mud pit outlet line 65A (FIG. 2B) or mud pit outlet line 65B (FIG. 2B), to separator 73 (FIG. 2A), to contacting apparatus 74 (FIG. 2B), to mud pump outlet line 66 (FIG. 2A), to contacting apparatus outlet line 72A or 72B (FIG. 2B), to treated pulsed power drilling fluid inlet line 75, and/or into drill string 20.

A method of managing water content of a pulsed power drilling fluid according to this disclosure can further comprise, as indicated at step 6 of FIG. 1, monitoring one or more electrical properties of the pulsed power drilling fluid and, when at least one of the one or more electrical properties is indicative of an increased water content of the pulsed power drilling fluid, contacting the pulsed power drilling fluid with the water absorbent material (e.g., as indicated at step 1 of FIG. 1) to produce the treated pulsed power drilling fluid. In such embodiments, the increased water content of the pulsed power drilling fluid can comprise a water concentration greater than a threshold level (e.g., a threshold water concentration) of the pulsed power drilling fluid. The threshold level of water in the pulsed power drilling fluid can be as described hereinabove, and maintaining the water concentration of the treated pulsed power drilling fluid below the threshold level and/or within the threshold range can provide for efficiency of pulsed power drilling and a reduction in the probability of a pulsed power drilling failure.

The contacting of the pulsed power drilling fluid with the water absorbent material (e.g., as indicated at step 1 of FIG. 1) can comprise contacting the pulsed power drilling fluid with an amount of the water absorbent material having an absorptive capacity large enough that, upon absorption of water from the pulsed power drilling fluid by the water absorbent material and optionally adding one or more non-water components of the pulsed power drilling fluid thereto without diluting the pulsed power drilling fluid by more than 20, 15, 10, or 5 volume percent, the treated pulsed power drilling fluid has a water content below the threshold level (e.g., the threshold water concentration for the treated pulsed power drilling fluid).

In embodiments, maintaining the water content of the pulsed power drilling fluid (e.g., of the treated pulsed power drilling fluid) below the threshold level thereof maintains a dielectric strength, a dielectric constant, and/or a conductivity as delineated above. For example, in embodiments, maintaining the water content of the pulsed power drilling fluid (e.g., of the treated pulsed power drilling fluid) below the threshold level (e.g., the threshold water concentration) maintains a conductivity of the treated pulsed power drilling fluid or of an internal phase thereof that is in a range of from about 6 to about 10 mho/cm, from about 5 to about 10 mho/cm, from about 4 to about 10 mho/cm, or less than or equal to about 10, 9, 8, 7, 6, 5, 4, 3, 2, or 1 mho/cm. In embodiments, maintaining the water content of the pulsed power drilling fluid (e.g., of the treated pulsed power drilling fluid) below the threshold level maintains a dielectric strength of the treated pulsed power drilling fluid greater than or equal to about 320, 310, 300, 290, 280, 270, 260, or 250 kV. In embodiments, maintaining the water content of the pulsed power drilling fluid (e.g., of the treated pulsed power drilling fluid) below the threshold level maintains a DE constant of the treated pulsed power drilling fluid greater than or equal to about 12, 11, 10, 9, 8, 7 or 6.

In embodiments, the one or more electrical properties monitored (e.g., as indicated at step 6 of FIG. 1) comprise the dielectric constant, the conductivity, the resistivity, or a combination thereof of the pulsed power drilling fluid. In embodiments, the monitoring of the one or more electrical properties of the pulsed power drilling fluid is effected at a location not adjacent pulsed power drill bit 40 that is positioned within wellbore 10. For example, in embodiments, the location not adjacent drill bit 40 comprises a location at or near surface 80 of wellbore 10. For example, as depicted in the embodiments of FIG. 2A and FIG. 2B, a monitoring location 95 can be proximate surface 80 of the earth or formation and/or proximate a top end 22 of drill string 20.

A method of pulsed power drilling according to this disclosure can thus comprise maintaining a water content of a pulsed power drilling fluid during drilling (e.g., at step 4 of FIG. 1), at a location of a pulsed power drill bit 40 within wellbore 10, below the threshold level thereof by utilizing a water absorbent material to remove water from the pulsed power drilling fluid, at or near surface 80 of the wellbore 10, prior to positioning the pulsed power drilling fluid proximate the location of the pulsed power drill bit 40 within wellbore 10. Accordingly, in embodiments, the system and method of this disclosure enable the water content of the pulsed power drilling fluid to be maintained without halting a drilling operation in the wellbore 10. For example, should water enter annulus 30 a distance from drill bit 40, the pulsed power drilling fluid that has been diluted by water migration into the annulus 30 can be returned to surface 80, and water removed therefrom via the contacting (e.g., the contacting as indicated at step 1 of FIG. 1) of the pulsed power drilling fluid with the water absorbent material, as described herein, prior to introducing the treated pulsed power drilling fluid down the wellbore 10 whereby the treated pulsed power drilling fluid comes into contact with pulsed power drill bit 40.

Also provided herein are a system and method of managing water content of a wellbore servicing fluid for servicing a wellbore. The system and method allow for contacting the wellbore servicing fluid with a water absorbent material comprising a molecular sieve, wherein the wellbore servicing fluid comprises water at a first water concentration, and whereby the water absorbent material absorbs at least a portion of the water from the wellbore servicing fluid to provide a spent water absorbent material comprising absorbed water and a treated wellbore servicing fluid, wherein the treated wellbore servicing fluid comprises water at a second water concentration, wherein the second water concentration is lower than the first water concentration. Such a system and method are applicable to wellbore servicing fluids including rotary drilling fluids as well as pulsed power drilling fluids.

Those of ordinary skill in the art will readily appreciate various benefits that may be realized by the present disclosure. For instance, in embodiments, the herein disclosed system and method enable real time adjustment of the water content of a wellbore servicing fluid, such as a pulsed power drilling fluid, whereby dielectric properties thereof can be maintained within desired ranges for pulsed power drilling.

By utilization of a water absorbent material (e.g., a water absorptive solid) that can be removed at the surface of the wellbore, in embodiments, water influx can be managed via the system and method of this disclosure without changing the overall dielectric character of a wellbore servicing fluid (e.g., a drilling fluid or pulsed power drilling fluid) experienced downhole, thus reducing or eliminating the chances of failure of the wellbore servicing operation (e.g., the drilling or pulse power drilling) and/or encountering a reduced wellbore servicing (e.g., drilling) efficiency.

EXAMPLES

Example 1: Absorption by Water Absorbent Materials in Presence of Water

Figure 3:
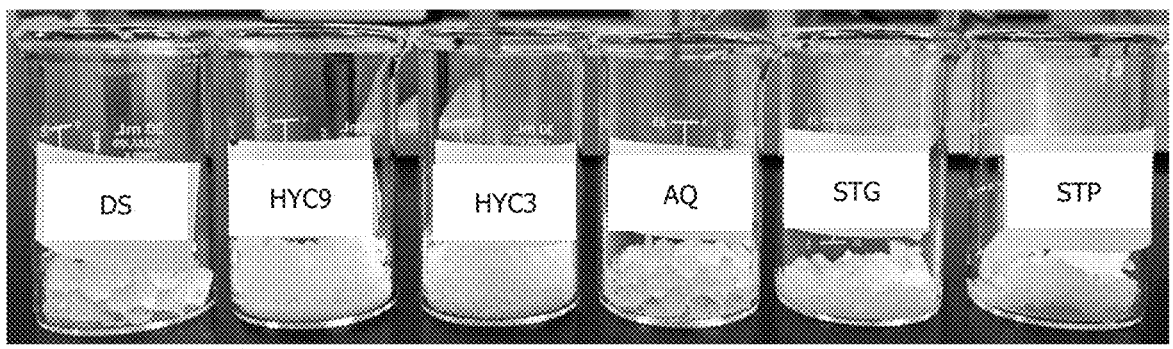
FIG. 3 is a picture of the water absorbent materials of Example 1 after the addition of 2 g of water over 1 g of material.

As described hereinabove, six different water absorbent materials were tested as potential water absorbents for drilling fluid treatments for removing water therefrom. The experiment of this Example 1 comprised adding water over the six water absorbent materials, adding 2 g of water for each gram of water absorbent material. FIG. 3 is a picture of the water absorbent materials after the addition of the 2 g of water over the 1 g of water absorbent material. In FIG. 3, DS comprises cross-linked anionic polyacrylamide, HYC9 comprises cross-linked polyacrylic acid, HYC3 comprises cross-linked polyacrylic acid, AQ comprises cross-linked copolymer of acrylamide and potassium acrylate, STG comprises modified corn and cassava starch, and STP comprises modified corn and cassava starch. As can be observed in FIG. 3, all six water absorbent materials tested in this Example 1 were able to absorb the added water, thus demonstrating that such water absorbent materials can be utilized for water removal as described herein.

Figure 4:
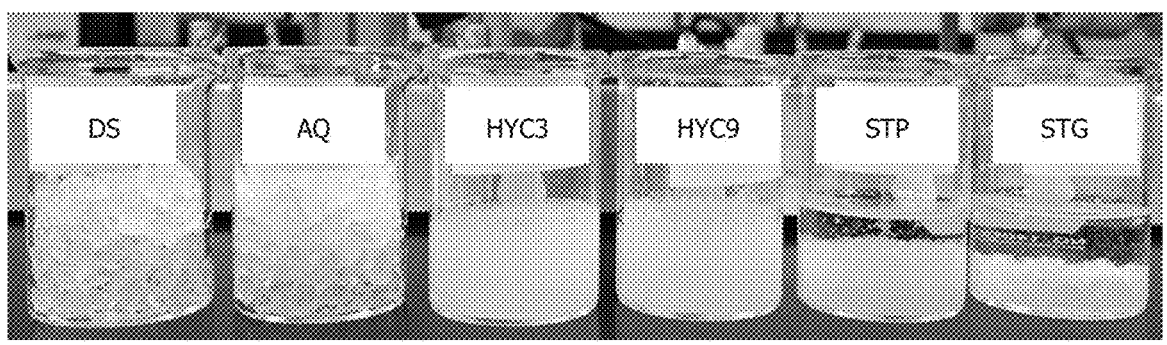
FIG. 4 is a picture of the water absorbent materials of Example 2 sixteen (16) hours after addition to an internal phase contaminated with 10% w/w of deionized water.

Example 2: Absorption by Water Absorbent Materials in Presence of Water and Internal Phase Components In this Example 2, the six water absorbent materials of Example 1 were evaluated regarding their capability of removing water from the components of a drilling fluid. FIG. 4 is a picture of the materials 16 hours subsequent the addition of an internal phase contaminated with 10 w/w deionized water. In this Example 2, the internal phase comprised a glycerin-water mixture at a 94:6 weight percent (% w/w) ratio. The results shown in FIG. 4 indicate that some of the materials absorbed water together with the non-water drilling fluid component. For example, from left to right, the water absorbent materials DS, AQ, HYC3, HYC9, STP and STG absorb less of the internal phase components along with the water.

Figure 5:
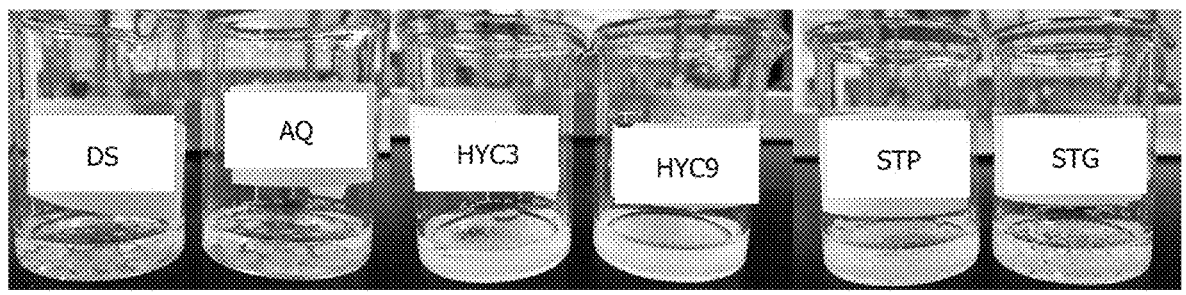
FIG. 5 shows the six water absorbent materials of Example 3 twelve (12) hours after adding to the internal phase of a pulse power drilling fluid.
Figure 6:
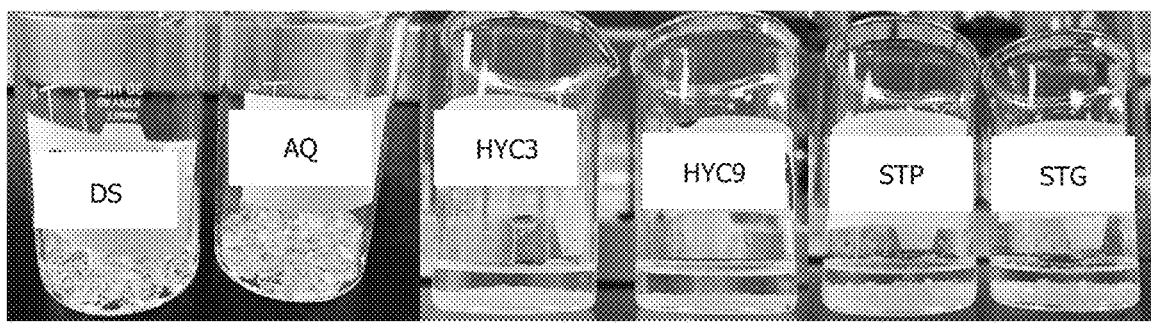
FIG. 6 shows the six water absorbent materials of Example 3 after 24 hours of contact with the internal phase.

Example 3: Absorption by Water Absorbent Materials in Presence of Internal Phase Components Alone In this Example 3, the absorption of the main components of the drilling fluid was evaluated in the absence of water, but the presence of the internal phase of Example 2. FIG. 5 shows the six absorbent materials 2 hours subsequent adding the internal phase of the pulse power drilling fluid thereto. It was observed that two of the water absorbent materials, DS and AQ, were more transparent and swollen, illustrating that part of the drilling fluid liquid was absorbed by these water absorbent materials. The water absorbent materials were left to rest for 24 hours. FIG. 6 shows the six water absorbent materials after 24 hours of contact with the internal phase. As can be seen, the water absorbent materials (e.g., DS and AQ) that presented higher absorption at the beginning (e.g., as seen in FIG. 5) absorbed all of the internal phase liquid.

Figure 7:
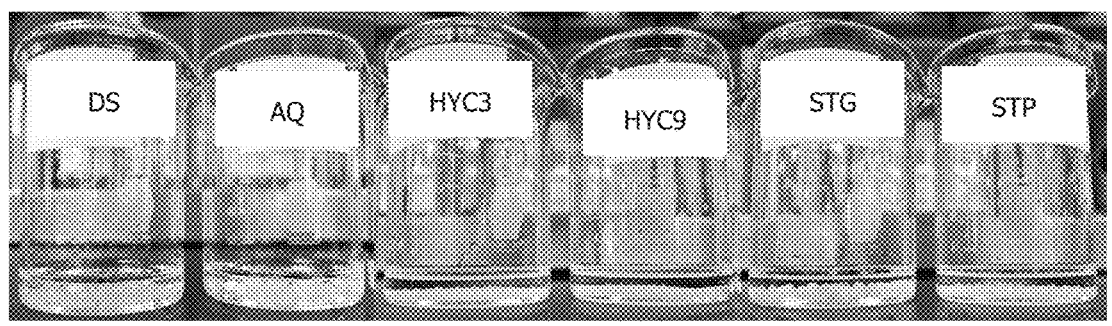
FIG. 7 shows the six water absorbent materials of Example 4 sixteen (16) hours after addition to the external phase of a pulsed power drilling fluid.

Example 4: Absorption by Water Absorbent Materials in Presence of External Phase In this Example 4, the absorption of the external phase of a pulse power drilling fluid was evaluated. FIG. 7 shows the six water absorbent materials of Example 1 sixteen (16) hours after addition to the external phase. In this Example 4, the external phase comprised an olefin. It can be observed from the results in FIG. 7, that there is no absorption of the external phase liquid by the water absorbent materials.

Examples 1-4 illustrate how the herein disclosed systems and methods can employ a variety of water absorbent materials for managing the water content of a wellbore servicing fluid, such as a pulsed power drilling fluid. The results show that water absorbent material solids as described herein can be utilized to remove water from the drilling fluid, without removing components of the fluid, thus allowing the outcome of water influx to be managed without increasing the volume of the drilling fluid (and/or increasing the volume by a lesser amount than conventionally required). Thus, dilution of the pulsed power drilling fluid to maintain the threshold water concentration can be substantially reduced (e.g., reduced by at least 10, 20, 30, 40, 50, 60, 70, 80, 90, or 100 vol % relative to conventional systems and/or methods) or eliminated via the herein disclosed water management system and method.

ADDITIONAL DISCLOSURE

The following are non-limiting, specific embodiments in accordance with the present disclosure:

Embodiment A

A method of managing water content of a pulsed power drilling fluid, the method comprising: contacting the pulsed power drilling fluid with a water absorbent material, wherein the pulsed power drilling fluid comprises water at a first water concentration, and whereby the water absorbent material absorbs at least a portion of the water from the pulsed power drilling fluid to provide a treated pulsed power drilling fluid and a spent water absorbent material comprising absorbed water, wherein the treated pulsed power drilling fluid comprises water at a second water concentration, wherein the second water concentration is lower than the first water concentration.

Embodiment B

A method of managing water content of a pulsed power drilling fluid, the method comprising: drilling a wellbore with a pulsed power drill bit coupled to the end of a drill string, wherein the pulsed power drill bit switches a high voltage pulse across at least two electrodes in contact with the bottom of the wellbore to pulverize formation rock into drill cuttings and form the wellbore; circulating the pulsed power drilling fluid downward through the drill string, out the drill bit, and upward through an annular space formed between the drill string and the wellbore such that the drill cutting associated with the pulsed power drilling fluid and flow upward in the annular space; recovering a recovered pulsed power drilling fluid and associated drill cutting from the annular space; contacting all or a portion of the recovered pulsed power drilling fluid with a water absorbent material, wherein the recovered pulsed power drilling fluid comprises water at a first water concentration, and whereby the water absorbent material absorbs at least a portion of the water from the recovered pulsed power drilling fluid to provide a treated pulsed power drilling fluid and a spent water absorbent material comprising absorbed water, wherein the treated pulsed power drilling fluid comprises water at a second water concentration, wherein the second water concentration is lower than the first water concentration; and optionally removing all or a portion of the drill cuttings from the recovered pulsed power drilling fluid, from the treated pulsed power drilling fluid, or both.

Embodiment C

The method of Embodiment A or Embodiment B, wherein the treated pulsed power drilling fluid comprises an oil to water ratio (OWR) of the hydrophobic external phase to an internal phase that is in a range of from about 40:60 to about 80:20 or from about 50:50 to about 65:35.

Embodiment D

The method of any of Embodiment A through Embodiment C, wherein the internal phase of the treated pulsed power drilling fluid comprises from about 0 to about 20, from about 0 to about 10, or less than or equal to about 20, 15, 10, 5, 4, 3, 2, 1, or 0 volume percent (vol %) water.

Embodiment E

The method of any of Embodiment A through Embodiment D, wherein the internal phase of the treated pulsed power drilling fluid further comprises from about 80 to about 100, from about 90 to about 100, or greater than or equal to about 80, 85, 90, 95, 96, 97, 98, 99, or 100 volume percent (vol %) glycerin.

Embodiment F

The method of any of Embodiment A through Embodiment E, wherein the hydrophobic external phase comprises a crude oil, diesel, a mineral oil, a paraffin, an olefin, an esters, bio-diesel, a fluorocarbon, or a combination thereof.

Embodiment G

The method of any of Embodiment A through Embodiment F, wherein, in addition to water, the water absorbent material further absorbs an additional component of the pulsed power drilling fluid, and wherein the method further comprises, subsequent the contacting of the pulsed power drilling fluid with the water absorbent material, adding an amount of the additional component back to provide the treated pulsed power drilling fluid.

Embodiment H

The method of any of Embodiment A through Embodiment G, wherein the treated pulsed power drilling fluid is provided without diluting by more than 10, 15, or 20% of a volume of the pulsed power drilling fluid.

Embodiment I

The method of any of Embodiment A through Embodiment H, wherein the second water concentration is less than a threshold level of the pulsed power drilling fluid.

Embodiment J

The method of any of Embodiment A through Embodiment I, wherein the treated pulsed power drilling fluid: is insulative, as defined by a dielectric strength greater than or equal to about 320 kV, 300 kV, or 250 kV; has a dielectric (DE) constant that is greater than or equal to about 12, 9, or 6; and/or has a low conductivity, as defined by a conductivity that is in a range of from about 6 to about 10 mho/cm, from about 5 to about 10 mho/cm, from about 4 to about 10 mho/cm, or less than or equal to about 10, 9, 8, 7, 6, 5, 4, 3, 2, or 1 mho/cm.

Embodiment K

The method of any of Embodiment A through Embodiment J, wherein contacting the pulsed power drilling fluid with the water absorbent material comprises introducing the water absorbent material into a flowing stream of the pulsed power drilling fluid and/or into a non-flowing volume of the pulsed power drilling fluid.

Embodiment L

The method of Embodiment K, wherein introducing the water absorbent material into the non-flowing volume of the pulsed power drilling fluid comprises introducing the water absorbent material into a mud pit.

Embodiment M

The method of Embodiment K, wherein contacting the pulsed power drilling fluid with the water absorbent material comprises introducing a permeable container containing the water absorbent material into the flowing stream of the pulsed power drilling fluid and/or into the non-flowing volume of the pulsed power drilling fluid.

Embodiment N

The method of any of Embodiment A through Embodiment M further comprising: separating the treated pulsed power drilling fluid from the spent water absorbent material; and optionally: wherein, in addition to water, the water absorbent material further absorbs an additional component of the pulsed power drilling fluid, and wherein the method further comprises, subsequent the contacting of the pulsed power drilling fluid with the water absorbent material, adding an amount of the additional component to the treated pulsed power drilling fluid.

Embodiment O

The method of Embodiment N, wherein separating the treated pulsed power drilling fluid from the spent water absorbent material comprises screening and/or otherwise filtering the spent water absorbent material from the treated pulsed power drilling fluid.

Embodiment P

The method of Embodiment 0, wherein the spent water absorbent material has a particle size of greater than or equal to about 400 mesh (37 µm), 325 mesh (44 µm), 270 mesh (53 µm), 230 mesh (63 µm), 200 mesh (74 µm), 170 mesh (88 µm), 140 mesh (105 µm), 120 mesh (125 µm), 100 (150 µm), 80 mesh (177 µm), 70 mesh (210 µm), or 60 mesh (250 µm).

Embodiment Q

The method of claim N, wherein separating the treated pulsed power drilling fluid from the spent water absorbent material comprises separating the spent water absorbent material from the treated pulsed power drilling fluid via gravity.

Embodiment R

The method of Embodiment N, wherein contacting the pulsed power drilling fluid with the water absorbent material comprises passing a stream of the pulsed power drilling fluid through a non-flowing volume of the water absorbent material.

Embodiment S

The method of any of Embodiment A through Embodiment N, wherein separating the treated pulsed power drilling fluid from the spent water absorbent material comprises passing a stream of the treated pulsed power drilling fluid out of a non-flowing volume of the absorbent material or removing a non-flowing volume of the water absorbent material from a volume of the treated pulsed power drilling fluid.

Embodiment T

The method of any of Embodiment A through Embodiment S further comprising regenerating the spent water absorbent material.

Embodiment U

The method of Embodiment T, wherein regenerating the spent water absorbent material comprises removing absorbed water from the spent water absorbent material to provide a regenerated absorbent.

Embodiment V

The method of Embodiment U, wherein regenerating comprises heating, exposing the spent water absorbent material to microwaves, or a combination thereof.

Embodiment W

The method of any of Embodiment A through Embodiment V further comprising monitoring one or more electrical properties of the pulsed power drilling fluid and, when at least one of the one or more electrical properties is indicative of an increased water content of the pulsed power drilling fluid, contacting the pulsed power drilling fluid with the water absorbent material.

Embodiment X

The method of Embodiment W, wherein the increased water content of the pulsed power drilling fluid comprises a water concentration greater than a threshold level of the pulsed power drilling fluid.

Embodiment Y

The method of Embodiment W or Embodiment X, wherein the one or more electrical properties comprise the dielectric constant, the conductivity, the resistivity, or a combination thereof of the pulsed power drilling fluid.

Embodiment Z1

The method of any of Embodiment W through Embodiment Y further comprising performing the monitoring of the one or more electrical properties at a location not adjacent a drill bit that is positioned within the wellbore.

Embodiment Z2

The method of Embodiment Z1, wherein the location not adjacent the drill bit comprises a location at or near a surface of the wellbore.

Embodiment Z3

The method of any of Embodiment A through Embodiment Z2, wherein the water absorbent material comprises a superabsorbent polymer (as defined by ability to absorb at least 50 times its weight in water), drierite, cellulose fiber, a clathrate structure, a molecular sieve, a modified starch, or a combination thereof.

Embodiment Z4

The method of any of Embodiment A through Embodiment Z3, wherein the water content of the pulsed power drilling fluid is maintained without halting a drilling operation in the wellbore.

Embodiment Z5

A pulsed power drilling fluid comprising a water absorbent material comprising a superabsorbent polymer (as defined by ability to absorb at least 50 times its weight in water), drierite, a cellulose fiber, a clathrate structure, a molecular sieve, a modified starch, or a combination thereof.

Embodiment Z6

The pulsed power drilling fluid of Embodiment Z5, wherein the pulsed power drilling fluid further comprises a hydrophobic external phase and an internal phase comprising water and glycerin.

Embodiment Z7

A method of servicing a wellbore, the method comprising: introducing a pulsed power drilling fluid into a formation; and maintaining a water concentration of the pulsed power drilling fluid below a threshold level by removing water from the wellbore servicing fluid as needed via contacting of the wellbore servicing fluid with a water absorbent material comprising a superabsorbent polymer (as defined by ability to absorb at least 50 times its weight in water), drierite, a cellulose fiber, a clathrate structure, a molecular sieve, a modified starch, or a combination thereof, whereby water is absorbed by the water absorbent material to provide a spent water absorbent material, and separating the spent water absorbent material from the pulsed power drilling fluid.

Embodiment Z8

The method of Embodiment Z7, wherein the pulsed power drilling fluid comprises a hydrophobic external phase and an internal phase comprising glycerin and water.

Embodiment Z9

A method of pulsed power drilling, the method comprising: maintaining a water content of a pulsed power drilling fluid, at a location of a pulsed power drill bit within a wellbore, below a threshold level by utilizing a water absorbent material to remove water from the pulsed power drilling fluid, at or near a surface of the wellbore, prior to positioning the pulsed power drilling fluid proximate the location of the pulsed power drill bit.

Embodiment Z10

The method of Embodiment Z9 further comprising monitoring one or more electrical signals of the pulsed power drilling fluid and, when at least one of the one or more electrical signals is indicative of a water content above or approaching the threshold level, contacting the pulsed power drilling fluid with an amount of the water absorbent material having an absorptive capacity large enough that, upon absorption of water from the pulsed power drilling fluid by the water absorbent material and optionally adding one or more non-water components of the pulsed power drilling fluid thereto without diluting the pulsed power drilling fluid by more than 20, 15, 10, or 5 volume percent, the pulsed power drilling fluid has a water content below the threshold level.

Embodiment Z11

The method of Embodiment Z9 or Embodiment Z10, wherein maintaining the water content of the pulsed power drilling fluid below the threshold level maintains a conductivity of the pulsed power drilling fluid or of an internal phase thereof that is in a range of from about 6 to about 10 mho/cm, from about 5 to about 10 mho/cm, from about 4 to about 10 mho/cm, or less than or equal to about 10, 9, 8, 7, 6, 5, 4, 3, 2, or 1 mho/cm.

Embodiment Z12

A method of managing water content of a wellbore servicing fluid for servicing a wellbore, the method comprising: contacting the wellbore servicing fluid with a water absorbent material comprising a molecular sieve, wherein the wellbore servicing fluid comprises water at a first water concentration, and whereby the water absorbent material absorbs at least a portion of the water from the wellbore servicing fluid to provide a treated wellbore servicing fluid and a spent water absorbent material comprising absorbed water, wherein the treated wellbore servicing fluid comprises water at a second water concentration, wherein the second water concentration is lower than the first water concentration.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim.

Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method of managing water content of a pulsed power drilling fluid, the method comprising:
   contacting the pulsed power drilling fluid with a water absorbent material, wherein the pulsed power drilling fluid comprises water at a first water concentration, and whereby the water absorbent material absorbs at least a portion of the water from the pulsed power drilling fluid to provide a treated pulsed power drilling fluid and a spent water absorbent material comprising the absorbed water, wherein the treated pulsed power drilling fluid comprises a second water concentration, wherein the second water concentration is lower than the first water concentration and is less than or equal to about 20 volume percent (vol %) water,
   wherein the treated pulsed power drilling fluid comprises a hydrophobic external phase and an internal phase, the internal phase comprising the second water concentration and from about 80 to about 100 vol % glycerin.

2. The method of claim 1, wherein the second water concentration is less than or equal to about 15 vol % water and the glycerin is at a concentration of from about 85 to about 100 vol %.

3. The method of claim 1:
   wherein the treated pulsed power drilling fluid is provided without diluting a volume of the pulsed power drilling fluid by more than 10%; or
   wherein the second water concentration is less than a threshold water concentration level above which a pulsed power drilling operation fails or a drilling efficiency of a drilling operation operated therewith is reduced; or
   wherein the treated pulsed power drilling fluid is provided without diluting a volume of the pulsed power drilling fluid by more than 10%, and wherein the second water concentration is less than a threshold water concentration level above which a pulsed power drilling operation fails or a drilling efficiency of a drilling operation operated therewith is reduced.

4. The method of claim 1, wherein the treated pulsed power drilling fluid:
   is insulative, with a dielectric strength greater than or equal to about 250 kV;
   has a dielectric (DE) constant that is greater than or equal to about 6;
   has a low conductivity in a range of from about 6 to about 10 mho/cm; or
   is insulative having a dielectric strength greater than or equal to about 250 kV, a dielectric (DE) constant that is greater than or equal to about 6, and a low conductivity in a range of from about 6 to about 10 mho/cm.

5. The method of claim 1, wherein contacting the pulsed power drilling fluid with the water absorbent material comprises introducing the water absorbent material into a flowing stream of the pulsed power drilling fluid, wherein contacting the pulsed power drilling fluid with the water absorbent material comprises introducing the water absorbent material into a non-flowing volume of the pulsed power drilling fluid, or wherein contacting the pulsed power drilling fluid with the water absorbent material comprises introducing the water absorbent material into a flowing stream of the pulsed power drilling fluid and introducing the water absorbent material into a non-flowing volume of the pulsed power drilling fluid.

6. The method of claim 5:
   wherein contacting the pulsed power drilling fluid with the water absorbent material comprises introducing the water absorbent material into the non-flowing volume of the pulsed power drilling fluid, and wherein introducing the water absorbent material into the non-flowing volume of the pulsed power drilling fluid comprises introducing the water absorbent material into a mud pit; or
   wherein contacting the pulsed power drilling fluid with the water absorbent material comprises introducing the water absorbent material into the flowing stream of the pulsed power drilling fluid by introducing a permeable container containing the water absorbent material into the flowing stream of the pulsed power drilling fluid; or
   wherein contacting the pulsed power drilling fluid with the water absorbent material comprises introducing the water absorbent material into the non-flowing volume of the pulsed power drilling fluid by introducing a permeable container containing the water absorbent material into the non-flowing volume of the pulsed power drilling fluid.

7. The method of claim 1 further comprising:
   separating the treated pulsed power drilling fluid from the spent water absorbent material; or
   wherein, in addition to water, the water absorbent material further absorbs an additional component of the pulsed power drilling fluid, and wherein the method further comprises, subsequent the contacting of the pulsed power drilling fluid with the water absorbent material, adding an amount of the additional component to the treated pulsed power drilling fluid; or
   separating the treated pulsed power drilling fluid from the spent water absorbent material and wherein, in addition to water, the water absorbent material further absorbs an additional component of the pulsed power drilling fluid, and wherein the method further comprises, subsequent the contacting of the pulsed power drilling fluid with the water absorbent material, adding an amount of the additional component to the treated pulsed power drilling fluid.

8. The method of claim 7 further comprising regenerating the spent water absorbent material.

9. The method of claim 1, further comprising:
   separating the treated pulsed power drilling fluid from the spent water absorbent material, wherein the separating comprises screening, filtering, or both screening and filtering the spent water absorbent material from the treated pulsed power drilling fluid.

10. The method of claim 9, wherein the spent water absorbent material has a particle size of greater than or equal to 37 μm.

11. The method of claim 1 further comprising:
separating the treated pulsed power drilling fluid from the spent water absorbent material, wherein the separating comprises (i) separating the spent water absorbent material from the treated pulsed power drilling fluid via gravity, or (ii) passing a stream of the treated pulsed power drilling fluid out of a non-flowing volume of the spent absorbent material or removing a non-flowing volume of the spent absorbent material from a volume of the treated pulsed power drilling fluid; or
wherein contacting the pulsed power drilling fluid with the water absorbent material comprises passing a stream of the pulsed power drilling fluid through a non-flowing volume of the water absorbent material; or
a combination thereof.

12. The method of claim 1, wherein the water absorbent material comprises a superabsorbent polymer having an ability to absorb at least 50 times its weight in water, drierite, cellulose fiber, a clathrate structure, a molecular sieve, a modified starch, or a combination thereof.

13. The method of claim 1 further comprising monitoring one or more electrical properties of the pulsed power drilling fluid and, upon an increase in a water content above a threshold water concentration level of the pulsed power drilling fluid, as indicated by at least one of the one or more electrical properties, contacting the pulsed power drilling fluid with the water absorbent material.

14. The method of claim 13:
wherein the threshold water concentration level of the pulsed power drilling fluid is a water concentration above which a pulsed power drilling operation fails or a drilling efficiency of a drilling operation operated therewith is reduced; or
wherein the one or more electrical properties comprise the dielectric constant, the conductivity, the resistivity, or a combination thereof of the pulsed power drilling fluid; or
further comprising performing the monitoring of the one or more electrical properties at a location not adjacent a drill bit that is positioned within a wellbore; or
a combination thereof.

15. A method of servicing a wellbore, the method comprising:
introducing a treated pulsed power drilling fluid into a formation, wherein the treated pulsed power drilling fluid comprises a hydrophobic external phase and an internal phase, the internal phase comprising: less than or equal to about 20 volume percent (vol %) water and from about 80 to about 100 vol % glycerin; and
maintaining a water concentration of the treated pulsed power drilling fluid below a threshold water concentration level, above which a pulsed power drilling operation fails or a drilling efficiency of a drilling operation operated therewith is reduced, by removing water from a pulsed power drilling fluid removed from the formation via contacting of the pulsed power drilling fluid with a water absorbent material comprising a superabsorbent polymer having an ability to absorb at least 50 times its weight in water, drierite, a cellulose fiber, a clathrate structure, a molecular sieve, a modified starch, or a combination thereof, whereby the removed water is absorbed by the water absorbent material to provide a spent water absorbent material, and separating the spent water absorbent material from the pulsed power drilling fluid to provide the treated pulsed power drilling fluid.

16. The method of claim 15, wherein the internal phase of the treated pulsed power drilling fluid comprises less than or equal to about 15 vol % water and from about 85 to about 100 vol % glycerin.

17. A method of pulsed power drilling, the method comprising:
during pulsed power drilling of a wellbore with a pulsed power drill bit, maintaining a water content of a pulsed power drilling fluid, at a location of the pulsed power drill bit within the wellbore, below a threshold water concentration level of the pulsed power drilling fluid, by utilizing a water absorbent material to remove water from the pulsed power drilling fluid, proximate a surface of the wellbore, prior to positioning the pulsed power drilling fluid from which the water has been removed at the location of the pulsed power drill bit,
wherein the threshold water concentration level is a water concentration above which a pulsed power drilling operation fails or a drilling efficiency of a drilling operation operated therewith is reduced, and
wherein the pulsed power drilling fluid from which the water has been removed comprises a hydrophobic external phase and an internal phase, the internal phase comprising less than or equal to about 20 volume percent (vol %) water and from about 80 to about 100 vol % glycerin.

18. The method of claim 17 further comprising monitoring one or more electrical signals of the pulsed power drilling fluid and, upon an increase in a water content above the threshold water concentration level of the pulsed power drilling fluid, as indicated by at least one of the one or more electrical signals, contacting the pulsed power drilling fluid with an amount of the water absorbent material having an absorptive capacity whereby, upon absorption of water from the pulsed power drilling fluid by the water absorbent material and adding or not adding one or more non-water components of the pulsed power drilling fluid thereto, without diluting a volume of the pulsed power drilling fluid by more than 10 volume percent, the pulsed power drilling fluid has a water content below the threshold water concentration level.

19. The method of claim 17, wherein maintaining the water content of the pulsed power drilling fluid below the threshold water concentration level maintains a conductivity of the pulsed power drilling fluid or of the internal phase in a range of from about 6 to about 10 mho/cm.

* * * * *